United States Patent
Veith et al.

(10) Patent No.: US 9,996,345 B2
(45) Date of Patent: *Jun. 12, 2018

(54) VARIABLE LENGTH EXECUTION PIPELINE

(71) Applicant: Imagination Technologies Limited, Kings Langley (GB)

(72) Inventors: Kristie Veith, Beaverton, OR (US); Leonard Rarick, San Diego, CA (US); Manouk Manoukian, Hemel Hempstead (GB)

(73) Assignee: Imagination Technologies Limited, Kings Langley (GB)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/385,544

(22) Filed: Dec. 20, 2016

(65) Prior Publication Data

US 2017/0102942 A1    Apr. 13, 2017

Related U.S. Application Data

(63) Continuation of application No. 14/502,689, filed on Sep. 30, 2014, now Pat. No. 9,558,002.

(51) Int. Cl.
*G06F 9/38* (2018.01)
*G06F 9/30* (2018.01)
*G06F 15/80* (2006.01)

(52) U.S. Cl.
CPC ........ *G06F 9/3001* (2013.01); *G06F 9/30145* (2013.01); *G06F 9/3836* (2013.01); *G06F 9/3867* (2013.01); *G06F 15/8007* (2013.01)

(58) Field of Classification Search
None
See application file for complete search history.

(56) References Cited

U.S. PATENT DOCUMENTS 6,012,138 A    1/2000   Worrell
6,751,759 B1   6/2004   Sun
(Continued)

FOREIGN PATENT DOCUMENTS

EP    1315083       5/2003
GB    2287108 A     9/1995
WO    00/42499 A1   7/2000

*Primary Examiner* — Cheng-Yuan Tseng
(74) *Attorney, Agent, or Firm* — Vorys, Sater, Seymour and Pease LLP; Vincent M DeLuca (57) ABSTRACT

In an aspect, a pipelined execution resource can produce an intermediate result for use in an iterative approximation algorithm in an odd number of clock cycles. The pipelined execution resource executes SIMD requests by staggering commencement of execution of the requests from a SIMD instruction. When executing one or more operations for a SIMD iterative approximation algorithm, and an operation for another SIMD iterative approximation algorithm is ready to begin execution, control logic causes intermediate results completed by the pipelined execution resource to pass through a wait state, before being used in a subsequent computation. This wait state presents two open scheduling cycles in which both parts of the next SIMD instruction can begin execution. Although the wait state increases latency to complete an in-progress algorithm, a total throughput of execution on the pipeline increases.

16 Claims, 3 Drawing Sheets

(56) References Cited

U.S. PATENT DOCUMENTS

| | | | |
|---|---|---|---|
| 6,772,370 B1 | 8/2004 | Sun | |
| 6,859,873 B2 * | 2/2005 | Norden | G06F 9/3867 712/210 |
| 8,018,652 B2 | 9/2011 | Wernham et al. | |
| 8,074,051 B2 * | 12/2011 | Hokenek | G06F 9/3851 712/7 |
| 8,074,056 B1 | 12/2011 | Chen | |
| 8,738,860 B1 | 5/2014 | Griffin | |
| 8,806,181 B1 | 8/2014 | O'Bleness | |
| 8,819,398 B2 | 8/2014 | Orbach | |

* cited by examiner

VARIABLE LENGTH EXECUTION PIPELINE

BACKGROUND

Field:

In one aspect, the following relates to processor microarchitecture, and in a more particular aspect, to implementations of pipelined execution resources, such as multipliers.

Related Art:

An important aspect of computation is the ability to perform arithmetic. Processors, such as generally programmable processors, digital signal processors, and graphics processors, generally have a capability to perform arithmetic, such as one or more of integer, fixed, and floating point arithmetic. The performance of such arithmetic can be controlled by arithmetic instructions, which can vary among different architectures, but for the sake of example, can include add, subtract, multiply, divide, and square root instructions. A particular implementation of such instructions may involve decomposing such operations into operations that are supported on a particular hardware implementation. For example, a particular implementation may not have separate circuitry implementing a floating point multiplier (or more generally, a floating point math unit), and as such, a floating point multiply instruction may be implemented by emulating the instruction in microcode on the processor, within the operating system, or in compiled user-space code. Such emulation is always much slower than a dedicated hardware floating point unit. However, a hardware floating point unit can consume a large amount of area, and hence increase cost. Nevertheless, as transistor budgets continue to increase, along with the increased usage of floating point, dedicated hardware for arithmetic including floating point arithmetic also has become more common.

Some kinds of math instructions may be implemented using iterative refinement, so that an intermediate result is refined to a more precise result over multiple passes, until after a certain number of iterations, a result to a required number of bits of precision can be achieved.

As an example, there are several methods used to implement divide and square root functions in computer hardware. One of the most commonly used fast methods is the Newton-Raphson algorithm. For divide, an initial approximation of the reciprocal of the divisor is obtained (e.g., for $_b c^l$, the reciprocal of b is obtained). For square root, an initial approximation of the reciprocal of the input is obtained. Then a multiplier is used repeatedly to obtain approximations with higher accuracy. When sufficient accuracy has been obtained, the final result is determined. The final approximation is multiplied by the divided for divide, and for square root, it is multiplied by the input.

In particular, for divide, an initial approximation, $x_o$, of the reciprocal of the divisor, b, is improved upon by first computing $x_o*b-)t$. Then a better approximation, $x_i$ is calculated: $x_o*(2-t)-)x_i$. Since $x_o$ is an approximation to $^14$, t is close to 1 and so 2-t may be approximated by complementing the bits of t which can be done quickly. In these circumstances, the multiply module is used repeatedly (e.g., for Newton-Raphson, there are two multiplies for each iteration).

For square root, an approximation, $x_o$, of the reciprocal of the square root of the input, b, is improved by first computing $x_o*b-)$ t, then $x_o*t-)$ s, and then $x_o*(3-s)/2-)$ $x_i$, $x_i$ being a better approximation. Since $x_o$ is an approximation to the reciprocal of the square root of b, $x_o*x_o*b$ is close to 1, so *(3-s)/2 may be obtained quickly in a slightly modified method from what is used for divide. Again, the above shows that the multiply module is used repeatedly.

For example, dividing term A by term B (i.e., A/B) can be performed by finding the reciprocal of term B (1/B) using Newton-Raphson, and then multiplying that reciprocal by term A. Implementations of Newton-Raphson often involve using a LookUp Table (LUT) indexed by a portion of term B to produce an initial approximation of the reciprocal of B. Such initial approximation has relatively few bits of precision, and the number of bits of precision can be doubled for each Newton-Raphson iteration. Thus, for a double precision division, starting from 7 bits of precision, it can be expected that 3 iterations will be required to achieve at least 53 bits of precision for the mantissa of the double precision result.

SUMMARY

One aspect relates to an apparatus, such as a processor, for arithmetic calculation. The arithmetic calculations include calculations that are implemented by using several iterations of an execution resource. Such calculations can include one or more of divide, square root, reciprocal, and transcendentals, such as natural logarithm, exponential, sin, cos, hyperbolic tangent, cotangent, and so on. In a more particular aspect, a pipelined execution resource can produce a result for one multiplication of such an algorithm in an odd number of stages. For example, one Newton-Raphson multiplication may be completed in three stages, which can each have a single clock event. Processing of certain instructions occurs by splitting the instruction into multiple distinct processing parts that are staggered for execution in the pipeline. Such instructions also may require iterative refinement, or more generally, a result produced after an odd number of stages may be needed at a first stage of the pipeline. For example, a SIMD division instruction may comprise two single precision division requests. Processing of each of these requests is series-staggered in the pipeline.

When, a further such instruction is available to begin execution (e.g., a second SIMD division instruction), the pipelined execution resource is configured to dynamically introduce a wait stage in the odd-number of pipeline stages. The wait stage effectively makes the pipelined execution resource have an even number of pipeline stages (e.g., four stages), which causes increased latency for calculations in progress, but increases throughput of a larger set of calculations. As used here, a wait stage comprises hardware implementing a wait state as disclosed.

A more particular aspect relates to a pipelined multiplier that can produce an unrounded result of multiplying two mantissas (e.g., mantissas of floating point numbers) in three stages. The pipelined multiplier is used in an apparatus both for regular multiplications as well as multiplications used for implementing iterative algorithms. Such iterative algorithms include Newton-Raphson. When performing multiplications for non-iterative algorithms (e.g., a simple multiplications), the multiplier operates in a 3-stage mode to produce an initial result that may need further processing for normalization, rounding, trap processing in subsequent pipeline (finishing stages). When executing sparse multiplications for iterative algorithms, the multiplier also operates in the 3-stage mode. When executing dense multiplications for iterative algorithms, the multiplier operates in a 4-stage mode with a wait state.

DETAILED DESCRIPTION

Aspects of the disclosure relate to a pipelined execution resource for multi-pass computation, such as iterative approximations, and for other computations in which an intermediate result produced by the pipeline is used for producing another value, such as a further intermediate result. In an example embodiment, aspects of the disclosure are described with respect to a pipelined multiplier, used for performing division using Newton-Raphson.

Most high-speed designs for multipliers use multiple clocks to fully perform the multiplication of two mantissas. The circuitry to implement a multiplier, and specifically, a carry save adder (CSA) is a large structure that dominates an overall area of a hardware arithmetic unit. Therefore, a goal in the design of arithmetic units is to implement one multiplier and use that multiplier both for regular multiplication and also for multiplications conducted for iterative processes, such as for divide and square root operations.

Typically, a multiplier is pipelined to improve throughput. A number of pipeline stages in a multiply unit depends on clock speed, gate latencies, as well as what functionality is included, such as rounding of a result as well as possibly shifting to adjust for denormal operands and/or results. In a pipelined multiplier, several instructions may be in execution at the same time. When being used for divide or square root instead of a simple multiply (i.e., a multiply that is not part of an iterative process, such as Newton-Raphson), during the repeated passes for improving an approximation, some portions of the pipeline may be unneeded. For example, shifting and rounding may be skipped. As such, whereas the entire multiply unit pipeline may consist of 4 or 5 stages, a multiply for divide or square root approximation improvement may be ready for use in a next computation in only 3 or 4 clocks.

There are two precision formats commonly used today: single precision and double precision. Single precision uses a 32-bit format with an implied 24 bit mantissa. Double precision uses a 64-bit format with an implied 53-bit mantissa. In either case, 64-bit inputs are provided to a multiply unit. For double precision, one request uses the entire input. For single precision, two requests may be contained in one instruction with one request using the least significant 32-bits of each operand and the other using the most significant 32 bits. Providing two single precision requests in one instruction is an example of Single Instruction, Multiple Data (SIMD) instructions. When a SIMD single precision request is made for divide or square root, the two requests may be computed in pipeline fashion through the multiply unit (i.e., rather than in parallel because wider data paths may be used for additional precision and control issues may differ for the two or more requests in a SIMD instruction). Another reason that implementations may stagger these multiple requests is that a single LookUp Table (LUT) may be provided, which can serve only one request at a time. In order to pipeline the processing of the two requests, the start of processing of one request is staggered in time relative to the other request. Here, staggering a start of processing can be implemented by delaying commencement of a first stage of the pipeline by one scheduling cycle. For simplicity, it is assumed here that a scheduling cycle is congruent with a clock cycle, but other implementations are possible, and the operative consideration for an implementation is that the first stage of processing be completed for all of the requests in a SIMD instruction at a time when a request from a subsequent instruction is to use the first stage.

In the case where the approximation computations need only three pipeline stages of the multiply unit, applicants have recognized that a choice between latency and throughput for single precision SIMD operations is presented. If choosing best latency, one single precision SIMD instructions will use two of the three available pipeline stages, because for a given computation, after three clocks, the computation is ready to start at the top of the multiply unit. In such situation, the two parts of the SIMD computation can proceed as quickly as possible. However, if another single precision SIMD instruction is to be executed, that instruction must wait for scheduling until the earlier one is finished, before it can be started, since the in-progress SIMD computation is using ⅔ of the multiply unit capacity.

In one aspect, the disclosure applies to pipelines that have a minimum depth that is odd and greater than or equal to 3 stages, and supports executing a single SIMD instruction by starting execution of different components of the instruction on different clock cycles. The example uses a three-stage main pipeline section, which can process a two-wide SIMD vector (two requests per instruction). However, implementations of the disclosure can have a different odd number of pipeline stages, and support instructions with different even numbers of SIMD computations. Another example would be a pipeline with a depth of five, and SIMD instructions with two or four requests.

Applicants have recognized that the multiplier pipeline can be dynamically optimized to choose between reduced latency and greater throughput. In particular, by introducing a wait state before starting another pass through the multiply unit, a collective throughput of multiple SIMD instructions can be increased. In effect, in this scenario, each single precision SIMD instruction is using only half of the multiply unit capacity. Thus, two such SIMD single precision requests may be in computation at the same time, and the multiplier utilization at 100% instead of only 67%.

Figure 1:
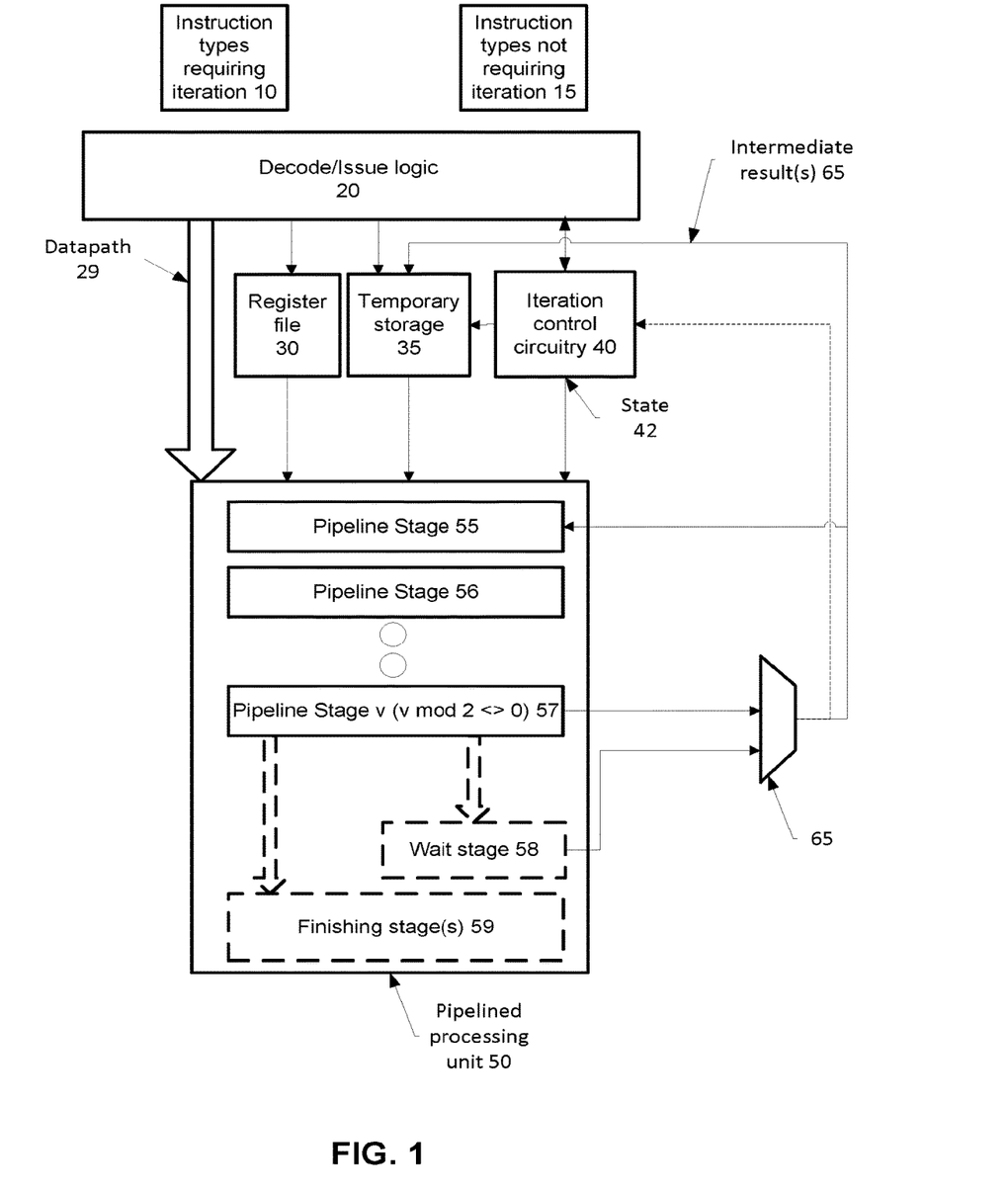
FIG. 1 depicts a block diagram of some aspects of a scheduling logic and a pipelined execution resource.

FIG. 1 depicts an example of a pipelined processing unit 50, which includes pipeline stages 55-57. Pipelined processing unit 50 also has a capability to insert a wait stage 58 into the pipeline, according to criteria explained below. Here, wait stage 58 can be inserted by providing a switch that determines whether an output of stage 57 is provided as input to wait stage 58 or to stage 57 and multiplexer 65. Control of whether output of stage 57 is provided to wait stage 58, a finishing stage 59, or to multiplexer 65 can be implemented in any of a variety of ways, which may depend on particulars of the implementation.

FIG. 1 depicts also that Pipelined processing unit 50 can receive values for use in computation from a register file 30, temporary storage 35, and from a feedback path from either pipeline stage 57 or from wait stage 58, from which a selection can be made using multiplexer 65. Pipelined processing unit 50 can be used to execute instruction types that require iteration 10 and instruction types that do not require iteration. Examples of instructions that require iteration include divide, square root, transcendentals, such as exponentiation, logarithm, and trigonometric functions. An example of a function that does not require iteration is multiplication. An instruction that requires iteration can be SIMD or single instruction single data. In an example, a SIMD divide can include data for two single precision division requests.

A multiplier is an example of pipelined processing unit 50. Such multiplier can, for example, have about two of the three stages allocated to a carry save adder, and a remainder allocated to a carry look ahead adder.

Pipeline stage 57 in the example of FIG. 1 is not a final stage of pipelined processing unit 50, in that outputs from stage 57 have not been finalized by finishing stages 59, which may including rounding, and operations relating to normalization. However, stage 57 is a stage at which intermediate results for refinement of iterative approximations are available. Therefore, stage 57 serves as an example of an intermediate output stage, and this term is used to refer to a stage of a pipelined processing unit at which a result can be obtained to be used as an input to an earlier stage of the pipelined processing unit. Thus, pipelined processing unit 50 is an example of a processing unit having a plurality of stages, where a subset of the stages performs a core part of an iterative operation, and an intermediate output stage of this subset is coupled to provide intermediate results to an earlier stage in the subset of stages.

Wait stage 58 can be implemented by a set of temporary stage elements, such as temporary registers, data path that routes values to the registers, in response to control signals indicating that the wait stage is to be used at a particular cycle. Datapath from the temporary registers through multiplexer 65 to pipeline stage 55 serves as datapath to return intermediate results for iteration.

Decode/issue logic 20 determines when instructions are dispatched for execution in pipelined processing unit 50. Datapath 29 can provide operand data to pipelined processing unit (e.g., immediate values contained in instructions). Decode/issue logic 20 can identify, for each instruction, the operands required for executing that instruction, determine operand availability, track availability of resources and determine whether resources required to execute a particular instruction will be available at appropriate times, so that the instruction can be scheduled. As an example, decode/issue logic 20 can include three stages. In stage 1, logic 20 can determine which categories of instructions are available to be picked. This determination can involve ensuring that instructions are not issued that require the same hardware resources at the same time (e.g., the same execution units or the result bus and so on). A second stage of logic 20 can pick instruction(s) from among the available categories of instructions; for example, such pick can be made based on operand readiness. In stage 3, logic 20 can begin retrieval of operands for picked instructions; such retrieval can include obtaining operands from register file, temporary storage 35, or by multiplexing an intermediate result of a prior computation through multiplexer 65. As used here, picking instructions can include taking a next instruction, or selecting from among multiple instructions.

Iteration control circuitry 40 controls usage of pipelined processing unit 50 for iterative approximation algorithms. Iteration control circuitry 40 can supply control information to decode/issue logic 20 that indicates when logic 20 can select a SIMD instruction that requires iteration. For example, in the context of divides and square root, iterative control circuitry 40 indicates to logic 20 when stage 55 is not processing a divide or square root, or if the last pass of a divide or square root in stage 55 is on a last pass. Another scheduling constraint is that logic 20 is not permitted to select two SIMD instructions in a row. As will become apparent from the following disclosure, each part of a SIMD instruction is split and executed on consecutive clocks, rather than in parallel, so that the second part of a given SIMD instruction begins stage 55 one clock later than the first part of the SIMD instruction. If SIMD instructions were wider than 2 and a pipeline were 5 stages or more, then this scheduling constraint would scale accordingly. Circuitry 40 outputs state 42 that controls how each pipelined stage performs computation for an iterative process, obtains source operands, and so forth.

In particular, multiplexer 65 can return either a result from pipeline stage 57 or wait stage 58 to pipeline stage 55, temporary storage 35, iteration control circuitry 40, or some combination thereof. Such value may be returned to temporary storage 35 in order to maintain the value until needed; this storage would thus contain values that differ in dependence on what kind of algorithm is being performed by iteration control circuitry 40. Temporary storage 35, or another suitable storage can include constants or tables of polynomial coefficients that are used for implementing different iterative approximation algorithms.

Figure 2:
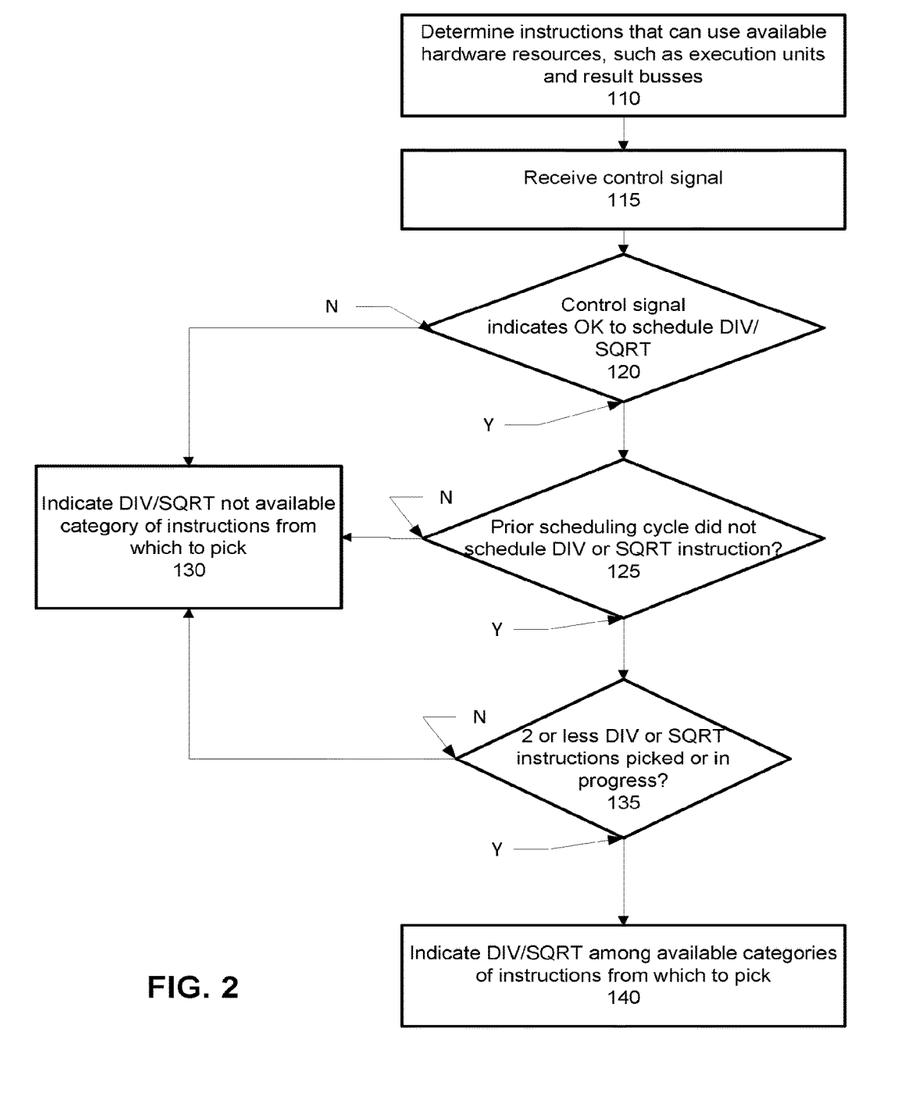
FIG. 2 depicts aspects of scheduling logic implemented in the example FIG. 1.

Aspects of instruction scheduling are explained with respect to FIG. 2, which depicts a process for scheduling divide and square root instructions. At 110, instructions that can use available hardware resources are determined. At 115, a control signal is received from circuitry 40 concerning status of previously dispatched iterative instructions. At 120, if the control signal indicates that it is acceptable to schedule a divide or square root instruction, and at 125, if the prior scheduling cycle did not schedule a divide or square root instruction, and at 135, if there are two or fewer divide or square root instructions picked or in progress, then divide and square root instructions categories are available from which to pick. If any of the determinations at 120, 125 and 135 fail, then at 130, divide and square root are indicated as not being available categories for selection.

Figure 3:
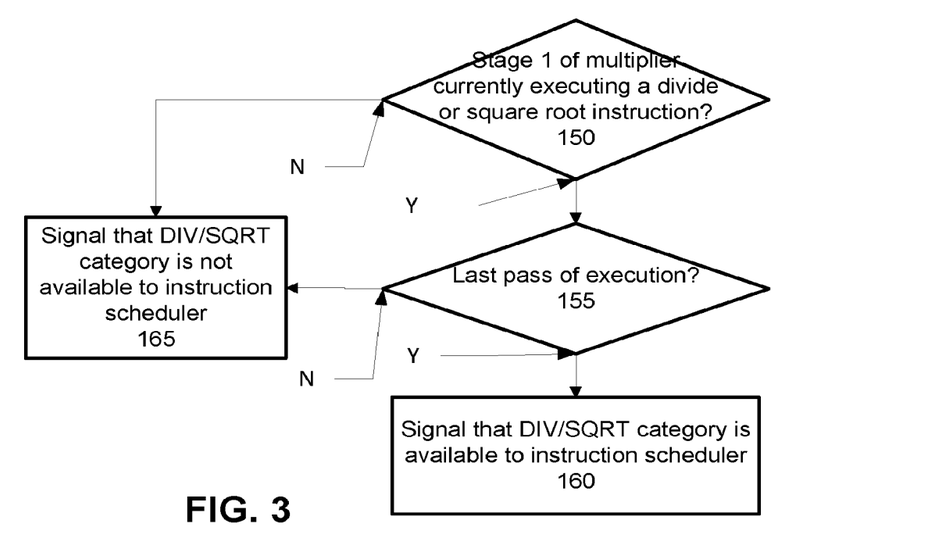
FIG. 3 depicts aspects of generating a control signal that can be used by scheduling logic in accordance with FIGS. 1 and 2.

FIG. 3 depicts an example process conducted to generate the control signal. At 150, a determination is made whether stage 1 of the multiplier (where FIG. 1 represents a multiplier, stage 55) is current executing an operation for a divide or square root, and if so, at 155, it is determined whether that operation is on a last pass (i.e, that such operation will not need to iterate through the multiplier again). If both conditions hold, then at 160, the signal is generated at 160 to indicate availability and if either condition is not true, then at 165, the signal can be generated to indicate unavailability. A convention concerning a value of the generated signal can be used to indicate a particular state.

These scheduling aspects and other operational characteristics of the example pipeline are explained below.

In a particular example, consider that a single precision divide computation needs five passes through a multiplier. This example can be based on a situation where an initial approximation is accurate to 7 bits of precision, one multiply is required to determine the initial approximation, and the number of bits of precision doubles for each additional approximation, which require two multiplications a piece. Also, this example ignores startup work (e.g., providing a first approximation) and a finishing work (e.g., rounding the result). A latency-optimized result provides that those 5 passes would take 16 clocks, 5*3 (15) of these clocks is for one of the SIMD computations, with the $16^{th}$ clock being for the other part of the SIMD calculation, which follows directly behind, and hence finishes one clock later. This example is show in Table 1 below, where pipeline stages 1, 2, and 3 displayed horizontally and time runs vertically, with each line representing one clock. The two divides are named A and B, with the number after the letter identifying the pass number through the multiply unit.

TABLE 1

| Clock | Stage 1 | Stage 2 | Stage 3 |
|---|---|---|---|
| 1 | A1 | | |
| 2 | B1 | A1 | |
| 3 | — | B1 | A1 |
| 4 | A2 | — | B1 |
| 5 | B2 | A2 | — |
| 6 | — | B2 | A2 |
| 7 | A3 | — | B2 |
| 8 | B3 | A3 | — |
| 9 | — | B3 | A3 |
| 10 | A4 | — | B3 |
| 11 | B4 | A4 | — |
| 12 | — | B4 | A4 |
| 13 | A5 | — | B4 |
| 14 | B5 | A5 | — |
| 15 | | B5 | A5 (DONE) |
| 16 | | | B5 (DONE) |

Table 2 below depicts that the scheduling can be rearranged so that the 5 passes would take 20 clocks: the first divide needs 19 clocks, and the next result follows directly behind. Each result of each last pass need not wait for the last wait stage, where no computation is performed.

TABLE 2

| Clock | Stage 1 | Stage 2 | Stage 3 | Wait |
|---|---|---|---|---|
| 1 | A1 | | | |
| 2 | B1 | A1 | | |
| 3 | — | B1 | A1 | |
| 4 | — | — | B1 | A1 |
| 5 | A2 | — | — | B1 |
| 6 | B2 | A2 | — | — |
| 7 | — | B2 | A2 | — |
| 8 | — | — | B2 | A2 |
| 9 | A3 | — | — | B2 |
| 10 | B3 | A3 | — | — |
| 11 | — | B3 | A3 | — |
| 12 | — | — | B3 | A3 |
| 13 | A4 | — | — | B3 |
| 14 | B4 | A4 | — | — |
| 15 | — | B4 | — | — |
| 16 | — | — | B4 | A4 |
| 17 | A5 | — | — | B4 |
| 18 | B5 | A5 | — | — |
| 19 | — | B5 | A5 (DONE) | |
| 20 | — | — | B5 (DONE) | |

This scheduling using the wait state is non-optimal for executing one SIMD instruction (containing 2 requests), because one more clock is required to complete each of the 5 passes. However, this scheduling opens two consecutive slots in each pipeline stage, and Applicants have recognized that these slots allow the scheduling the computation for another SIMD instruction, as explained below. First, a 3-stage pipeline solution is demonstrated in Table 3, and then a 3-stage compute, one wait state pipeline flow is depicted in Table 4.

Table 3 shows that two consecutive SIMD instructions that (each with two requests that require 5 passes) can be completed in 30 clock cycles, for a 3-stage pipeline).

TABLE 3

| Clock | Stage 1 | Stage 2 | Stage 3 |
|---|---|---|---|
| 1 | A1 | | |
| 2 | B1 | A1 | |
| 3 | — | B1 | A1 |
| 4 | A2 | — | B1 |
| 5 | B2 | A2 | — |
| 6 | — | B2 | A2 |
| 7 | A3 | — | B2 |
| 8 | B3 | A3 | — |
| 9 | — | B3 | A3 |
| 10 | A4 | — | B3 |
| 11 | B4 | A4 | — |
| 12 | — | B4 | A4 |
| 13 | A5 | — | B4 |
| 14 | B5 | A5 | — |
| 15 | C1 | B5 | A5 (DONE) |
| 16 | D1 | C1 | B5 (DONE) |
| 17 | — | D1 | C1 |
| 18 | C2 | — | D1 |
| 19 | D2 | C2 | — |
| 20 | — | D2 | C2 |
| 21 | C3 | — | D2 |
| 22 | D3 | C3 | — |
| 23 | — | D3 | C3 |
| 24 | C4 | — | D3 |
| 25 | D4 | C4 | — |
| 26 | — | D4 | C4 |
| 27 | C5 | — | D4 |
| 28 | D5 | C5 | — |
| 29 | — | D5 | C5 (DONE) |
| 30 | — | — | D5 (DONE) |

Table 4, below, depicts scheduling of four single precision requests, which came from a pair of SIMD instructions, that optimizes throughput on an example 3 stage pipeline, with a dynamically-inserted wait state, as exemplified in FIG. 1 with wait stage 58. Such a 3-stage compute, one wait state pipeline can complete the same work in 22 clock cycles (5*4+3−1), since the first result finishes in 5*4−1 and each of the next 3 follow on consecutive clocks. Thus, the introduction of a wait stage in the multiplier, which increases the latency of completing a first result, can be used to optimally schedule two pairs of SIMD requests for calculations requiring iteration, such as divide and square root.

TABLE 4

| Clock | Stage 1 | Stage 2 | Stage 3 | Wait |
|---|---|---|---|---|
| 1 | A1 | | | |
| 2 | B1 | A1 | | |
| 3 | C1 | B1 | A1 | |
| 4 | D1 | C1 | B1 | A1 |
| 5 | A2 | D1 | C1 | B1 |
| 6 | B2 | A2 | D1 | C1 |
| 7 | C2 | B2 | A2 | D1 |
| 8 | D2 | C2 | B2 | A2 |
| 9 | A3 | D2 | C2 | B2 |
| 10 | B3 | A3 | D2 | C2 |
| 11 | C3 | B3 | A3 | D2 |
| 12 | D3 | C3 | B3 | A3 |
| 13 | A4 | D3 | C3 | B3 |
| 14 | B4 | A4 | D3 | C3 |
| 15 | C4 | B4 | A4 | D3 |
| 16 | D4 | C4 | B4 | A4 |
| 17 | A5 | D4 | C4 | B4 |
| 18 | B5 | A5 | D4 | C4 |
| 19 | C5 | B5 | A5 (DONE) | D4 |
| 20 | D5 | C5 | B5 (DONE) | — |
| 21 | — | D5 | C5 (DONE) | — |
| 22 | — | — | D5 (DONE) | — |

Thus, one aspect of the disclosure comprises a multiplier that, in response to the availability of dense requests of this type, responds by inserting a wait stage in the pipeline, such that an intermediate result, which could be fed back on a particular clock, is made to wait one additional clock. In other words, one aspect of the disclosure comprises a multiplier with a dynamic pipeline depth. The multiplier provides a pipeline depth optimized for latency when the requests are sparse. The multiplier provides a pipeline depth optimized for throughput when the requests are dense. In one example, the multiplier requires 3 stages to provide a result for a further pass, and the width of the SIMD vector is 2.

Considerations on scheduling such a multiplier are explained below. In particular, instruction issue logic must be able to determine when an instruction may be issued to use the multiplier. Instruction issue logic for a fixed pipeline depth is relatively simple, since it is known in advance when a divide or square root needs the multiply pipeline for a certain pass (being that the next pass would occur a regular number of clock cycles after the prior one for that particular divide or square root operation). In particular, the instruction issue logic knows when the first pipeline stage is not available (e.g., no new instruction for the multiply unit is issued for clock 7 in Table 1, because the instruction issue logic can determine that the existing calculation A will need it. However, if a pass is sometimes three clocks and at other times is four clocks, the instruction issue logic needs more information to determine when an instruction can be issued to the multiply pipeline.

In the following example instruction issue logic, three stages (for ease of explanation, each stage is characterized as requiring one clock) are required to issue each instruction. Other implementations may be structured differently. The first clock determines what category of instructions are available to be picked for execution. Some considerations are to avoid scheduling more than one operation for each piece of hardware and avoiding the completion of multiple instructions that need the same result bus. As an example, if a divide is in progress that is going to use the first stage of the multiply pipeline (where a circuit has only a single multiply pipeline), then no multiply instruction may be available for selection, but perhaps an add instruction could be scheduled, if an adder is available. Such considerations and others are known to those of ordinary skill, and particular implementations may have other considerations to be accounted for. During the second clock, a pick of instructions from among the instructions determined in the first cycle, and which are otherwise ready for execution is made. Readiness can be determined, for example, based on availability of required operands. Thus, between the first two stages, a determination of instruction type that can be scheduled, and a determination of what instructions from a particular type that can be scheduled are made. Then, in the third clock, operands for each picked instruction can be retrieved. Such retrieval may include obtaining operands from register files, multiplexing result outputs from the execution units, or a combination thereof.

In some implementations, the result of the pick in the second clock of the instruction issue logic is not available soon enough to be used in the category selection that occurs in the first clock of the instruction issue logic for the next scheduling opportunity (i.e., the category determination for the next pick). Thus, if one category of instructions include divide and square root instructions and that category is selected as available in some clock, then that category may not be selected as available in the next scheduling cycle, because a SIMD single precision divide or square root needs two consecutive clocks in the multiply unit (a second part of the single SIMD instruction begins one clock later than the first), as explained with respect to Table 1, A and B, for example.

A dynamic pipeline depth is implemented with logic in the instruction issue module as well as the control for the divide and square root instructions, and a wait stage, which may or may not be used each clock. Iteration control circuitry 40 (e.g., for divide and square root control) sends a signal to instruction issue logic 20 that it may select a divide or square root instruction only when stage 55 is not currently executing a divide or square root instruction (or if it is known that this is the last pass through the multiply unit for that execution). Where logic 20 has three stages, the signal from circuitry 40 can be sent to the first stage, which determines available instruction categories for a pick made in a second stage of logic 20. The first stage of the instruction issue logic then specifies that divide and square root may be selected only when it has the permission from the divide and square root control and it did not make available a divide or square root instruction for selection in the previous clock.

Further, if more than two divides and/or square roots are in progress, then no further may be picked. When more than two are in progress, the execution pipeline stages are fully utilized so no improvement in performance is possible (in this example). For example, if there is a double precision computation occurring and also a pair of single precisions have been picked with the operands currently being fetched in the third clock of issuing, that is a total of three that have been picked so no further pick is allowed until at least one of these three have completed.

The iteration control circuitry 40 (e.g., for divide and square root control) routes the computation from stage 57 to stage 55 (from the intermediate output stage to a first stage) only if another pass through the multiply module is required and there is no instruction in the wait stage and no instruction has been picked that is going to the multiply module. If there is a computation in stage 57 that needs another pass through the multiply module and if is not routed to stage 55, then that computation proceeds to wait stage 58.

Under the constraints presented here, it cannot happen that a new instruction needs to use the multiply unit in the next clock (its data is being obtained for the start of execution in the next clock) at the same time that there is an instruction in the wait stage that will need stage 1 of the multiply unit the next clock. This is because if there is an instruction in the wait stage, then three clocks earlier it was in stage 55 (first stage), and permission was not given for an instruction pick that would go to the multiply unit in that cycle (and explained with respect to FIG. 2).

The following example shows the instruction issue stages for a three-stage instruction issue logic, as well as execution stages for two single precision SIMD instructions. The second SIMD instruction, which has requests C and D, could have been picked in clock 4 or clock 7. For illustration, it is presumes that operands are not yet ready for this instruction so that the pipeline change from 3 stages to 4 stages and then back to 3 stages is demonstrated. The left arrow, <, indicates that the allow category is permitted to specify a divide or square root selection as far as the divide/square root control logic is concerned.

TABLE 5

| Clock | Allow Category | Instruction Pick | Data Fetch | Stage 1 | Stage 2 | Stage 3 | Wait stage |
|---|---|---|---|---|---|---|---|
| 1 | Yes | — | — | <— | — | — | — |
| 2 | No | AB | — | <— | — | — | — |
| 3 | Yes | — | AB | <— | — | — | — |
| 4 | No | — | — | A1 | — | — | — |
| 5 | No | — | — | B1 | A1 | — | — |
| 6 | Yes | — | — | <— | B1 | A1 | — |
| 7 | No | — | — | A2 | — | B1 | — |
| 8 | No | — | — | B2 | A2 | — | — |
| 9 | Yes | — | — | <— | B2 | A2 | — |
| 10 | No | CD | — | A3 | — | B2 | — |
| 11 | No | — | CD | B3 | A3 | — | — |
| 12 | No | — | — | C1 | B3 | A3 | — |
| 13 | No | — | — | D1 | C1 | B3 | A3 |
| 14 | No | — | — | A4 | D1 | C1 | B3 |
| 15 | No | — | — | B4 | A4 | D1 | C1 |
| 16 | No | — | — | C2 | B4 | A4 | D1 |
| 17 | No | — | — | D2 | C2 | B4 | A4 |
| 18 | No | | | A5 | D2 | C2 | B4 |
| 19 | No | | | B5 | A5 | D2 | C2 |
| 20 | No | | | C3 | B5 | A5 (D) | D2 |
| 21 | No | | | D3 | C3 | B5 (D) | — |
| 22 | Yes | | | <— | D3 | C3 | — |
| 23 | No | | | C4 | — | D3 | — |
| 24 | No | | | D4 | C4 | — | |
| 25 | Yes | | | <— | D4 | C4 | — |
| 26 | No | | | C5 | — | D4 | — |
| 27 | No | | | D5 | C5 | — | |
| 28 | Yes | | | | D5 | C5 (D) | — |
| 29 | No | | | | | D5 (D) | — |
| 30 | Yes | | | | | | — |
| 31 | No | | | | | | — |
| 32 | Yes | | | | | | |

In the pipeline presented, three double-precision divide and/or square root computations can take place concurrently, and so the wait stage is not used. A more complicated mechanism that provides for four double precision operations to be executed concurrently can be devised. However, because three double-precision divides and/or square roots fully use the computational pipeline resources, no advantage in throughput is obtained by allowing four double precision operations to be in flight.

Table 6 shows a conflict resulting from incorrect scheduling in clock 5 of the pipeline example of FIG. 1. In the seventh clock of Table 6, A1 has to go to the wait stage because D1 needs stage 1. Hence in the eighth clock, A1 needs to go to stage 1, but so does a new computation E. Thus, E should not have been allowed in the fifth clock, which ultimately resulted in E being ready to enter stage 55 (a first stage) of the pipeline at clock 8.

TABLE 6

| Clock | Allow Category | Instruction Pick | Data Fetch | Stage 1 | Stage 2 | Stage 3 | Wait stage |
|---|---|---|---|---|---|---|---|
| 1 | Yes | — | — | <— | — | — | — |
| 2 | No | A | — | <— | — | — | — |
| 3 | Yes | — | A | <— | — | — | — |
| 4 | No | CD | — | A1 | — | — | — |
| 5 | No/[Yes] | — | CD | | A1 | — | — |
| 6 | No | E | | C1 | | A1 | |
| 7 | No | | E | [D1] | C1 | | A1 |
| 8 | No | | | #### | D1 | C1 | |

Variations on the above examples can be implemented. For example, issue logic can be designed to require four cycles instead of three. In an example of such an implementation, these four issue cycles may be: 1 allow (as before), 2 pick (as before), 3 register read (as before), and 4 bypass network. In this case, scheduling logic would not allow scheduling if there will be an execution in stage 55 (first stage) in the next clock, rather than preventing scheduling if there is an execution currently in stage 55 (first stage). This example shows that various implementations can be made of the disclosure.

The above disclosure primarily related to an example of a multiply pipeline that can dynamically change length, in order to optimize for latency or throughput, and also to a generalized execution pipeline meeting the criteria set forth (odd depth to produce intermediate results, executes SIMD instructions with even numbers of requests in staggered formation, and provides dynamic insertion of a wait state for in-progress computation under conditions in which a SIMD iterative instruction is ready to enter the execution pipeline). The following portion of the disclosure presents examples that generalize the application of the techniques exemplified above to other execution units and types of computation. As an example, a wait state can be inserted by controlling a switch that determines where an output of the stage prior to the wait state goes, and a multiplexer after the wait state that determines whether an input is to be taken from the wait state or from the output of the stage prior to the wait state.

The above disclosure primarily related to an implementation in which SIMD instructions each have two requests. However, other implementations are possible. For example, an implementation can support SIMD instructions with four requests. In such an implementation, scheduling of a SIMD instruction with four requests causes insertion of a wait stage immediately, and at that point, the pipeline is saturated, until a last pass of the iteration being performed. By particular example, a pipeline with three stages, during operation on single request instructions, can increase to a four-stage pipeline, in order to process a SIMD instruction with four requests. Each request in the four-request SIMD instruction would be staggered in the pipeline, so that once a leading request reached the last stage (e.g., the wait stage), the four-stage pipeline would be filled by the four requests. An implementation also can support SIMD instructions with two requests, four requests, and single requests. The two request and single request instructions are handled as disclosed above, and the four request SIMD instructions cause immediate wait-stage insertion. To be clear, an implementation need not support both two-request and four-request SIMD instructions.

Implementations according to the disclosure also can be understood as identifying a set of instructions that collectively comprise more requests than stages in a pipeline that will execute the requests. The requests can be a mixture of SIMD and single request instructions; the SIMD instructions can have two, four, or more requests. The implementation may support only two-request SIMD instructions, only four-request SIMD instructions, or both two-request and four-request SIMD instructions. The pipeline processes SIMD instructions by staggering the requests in the pipeline, e.g., a two-request SIMD instruction occupies two pipeline stages, and the second request enters the pipeline one scheduling opportunity (e.g., one clock) after the first request. The set of instructions can include instructions that have begun execution and remain in process. Implementations insert one or more wait stages in the pipeline, in response to such condition, resulting in a situation where, including the wait stage, all of the requests described by the set of instructions can occupy a stage of the pipeline.

One example category of computation that can be performed in an execution unit according to the disclosure are calculating transcendental functions (e.g., exponentiation, logarithms and trigonometric functions) using Taylor series expansion. For example, a Taylor series for evaluating sin x is found in equation 1, below:

$$\sin x = \sum_{n=0}^{\infty} \frac{(-1)^n}{(2n+1)!} x^{2n+1} = x - \frac{x^3}{3!} + \frac{x^5}{5!} \text{ for all } x \quad \text{(Equation 1)}$$

Computation required to approximate sin x using this approach can include splitting the positive and negative terms, adding a finite number of initial positive terms together and adding a finite number of initial negative terms together, before making a final subtraction of those addends. Additionally, an order of computation can include calculating the high order powers of x before the low order powers.

For example, in order to calculate sin x to a desired precision, it can be determined that a certain number of terms are required. For example, if 8 terms provided enough precision for a given calculation, then $$\sin x \approx x - \frac{x^3}{3!} + \frac{x^5}{5!} - \frac{x^7}{7!} + \frac{x^9}{9!} - \frac{x^{11}}{11!} + \frac{x^{13}}{13!} - \frac{x^{15}}{15!}.$$

These terms can be split into collections of positive and negative terms:

$$t_1 = x + \frac{x^5}{5!} + \frac{x^9}{9!} + \frac{x^{13}}{13!} \text{ and } t_2 = \frac{x^3}{3!} + \frac{x^7}{7!} + \frac{x^{11}}{11!} + \frac{x^{15}}{15!},$$

where sin $x \approx t_1 - t_2$. These values can be computed in a pipelined fashion according to the disclosure, as exemplified below. While the following is an example, other approaches to organizing such computation for execution are possible.

First, $x^2$ is calculated without pipelining, then $x^4$ and $x^3$ are calculated in a pipelined fashion (e.g. calculation of $x^3$ follows the calculation of $x^4$ by one clock). Then $$A_1 = \frac{1}{11!} + \frac{1}{15!} x^4$$

is calculated, which is constituted by a multiply with one extra partial product term of 1/11!. Then, $$B_1 = \frac{1}{9!} + \frac{1}{13!} x^4$$

is calculated, which also is constituted by a multiply with one extra partial product term. Then, each of these results ($A_1$ and $B_1$) are fed back to produce the next term in their respective summations (i.e., $t_1$ and $t_2$). These terms are $A_2 = 1/7! + A_1 x^4$ and $B_2 = 1/5! + B_1 x^4$. These terms are used to produce subsequent terms: $A_3 = 1/3! + A_2 x^4$ and $B_3 = 1 + B_2 x^4$. Then, $t_1 = B_3 x$ and $t_2 = A_3 x^3$, and the final subtraction can then be performed, This organization provides that the terms with larger powers of x are calculated first, and that negative and positive values are separately summed. These practices lead to a more precise result when implemented in a typical hardware. The computation of $x^4$ and $x^3$ and then $A_1$ and $B_1$ through $t_1$ and $t_2$ matches the flow shown in Table 7.

As another example, Fourier series involve summations of values that can be calculated according to the pipelined approach described above. For example, Fourier series involves multiplying coefficients with an evaluation of sine and/or cosine functions at a particular point, There are a variety of ways that the computation represented by Equation 1 to be performed in a machine. One consideration is that calculations for small values should be handled together, rather than mixing calculations involving small and large values. Keeping small value calculations together avoids having precision in the small value being lost due to normalization required to combine the small and large value (e.g., add or multiply). Also, it is preferable to group all of the additions together and all of the subtractions together. Further, for the purposes of this disclosure, computations can be organized into pairs, to follow each other in a pipeline that can dynamically insert a wait state, as disclosed.

Figure 4:
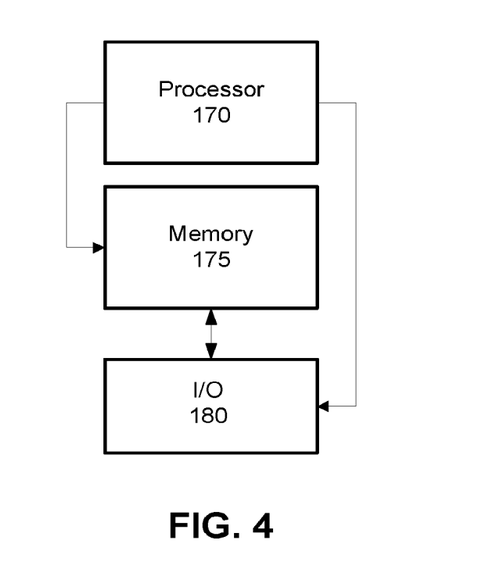
FIG. 4 depicts a block diagram of portions of an apparatus that can contain the structures depicted in FIG. 1.

FIG. 4 depicts a block diagram of some components of an apparatus that may contain the structures depicted in FIG. 1. Such apparatus is depicted as comprising a processor 170, which may contain the structures depicted in FIG. 1, a memory 175 coupled to the processor, and I/O circuitry 180. I/O circuitry may be tailored to a particular apparatus, and can include wireless and wired networking circuitry, such as PHY and MAC hardware for WiFi, Ethernet, display controllers, keyboard, mouse inputs, sensor inputs, camera inputs, and so forth. Memory 175 can be implemented by any combination of non-volatile and volatile memoriues of suitable technology, such as flash memory, magnetic storage, dynamic RAMs, static RAMs, and so forth. The structures depicted in FIG. 4 may themselves be contained in a computer device, such as a laptop, smartphone, tablet, may be embedded in other devices, such as fixed function devices, wearable devices, sensors, network equipment, and so on.

Modern general purpose processors regularly require in excess of two billion transistors to be implemented, while graphics processing units may have in excess of five billion transistors. Such transistor counts are likely to increase. Such processors have used these transistors to implement increasing complex operation reordering, prediction, more parallelism, larger memories (including more and bigger caches) and so on. As such, it becomes necessary to be able to describe or discuss technical subject matter concerning such processors, whether general purpose or application specific, at a level of detail appropriate to the technology being addressed. In general, a hierarchy of concepts is applied to allow those of ordinary skill to focus on details of the matter being addressed.

For example, high level features, such as what instructions a processor supports conveys architectural-level detail. When describing high-level technology, such as a programming model, such a level of abstraction is appropriate. Microarchitectural detail describes high level detail concerning an implementation of an architecture (even as the same microarchitecture may be able to execute different ISAs). Yet, microarchitectural detail typically describes different functional units and their interrelationship, such as how and when data moves among these different functional units. As such, referencing these units by their functionality is also an appropriate level of abstraction, rather than addressing implementations of these functional units, since each of these functional units may themselves comprise hundreds of thousands or millions of gates. When addressing some particular feature of these functional units, it may be appropriate to identify substituent functions of these units, and abstract those, while addressing in more detail the relevant part of that functional unit.

Eventually, a precise logical arrangement of the gates and interconnect (a netlist) implementing these functional units (in the context of the entire processor) can be specified. However, how such logical arrangement is physically realized in a particular chip (how that logic and interconnect is laid out in a particular design) still may differ in different process technology and for a variety of other reasons. Many of the details concerning producing netlists for functional units as well as actual layout are determined using design automation, proceeding from a high level logical description of the logic to be implemented (e.g., a "hardware description language").

The term "circuitry" does not imply a single electrically connected set of circuits. Circuitry may be fixed function, configurable, or programmable. In general, circuitry implementing a functional unit is more likely to be configurable, or may be more configurable, than circuitry implementing a specific portion of a functional unit. For example, an Arithmetic Logic Unit (ALU) of a processor may reuse the same portion of circuitry differently when performing different arithmetic or logic operations. As such, that portion of circuitry is effectively circuitry or part of circuitry for each different operation, when configured to perform or otherwise interconnected to perform each different operation. Such configuration may come from or be based on instructions, or microcode, for example.

In all these cases, describing portions of a processor in terms of its functionality conveys structure to a person of ordinary skill in the art. In the context of this disclosure, the term "unit" refers, in some implementations, to a class or group of circuitry that implements the functions or functions attributed to that unit. Such circuitry may implement additional functions, and so identification of circuitry performing one function does not mean that the same circuitry, or a portion thereof, cannot also perform other functions. In some circumstances, the functional unit may be identified, and then functional description of circuitry that performs a certain feature differently, or implements a new feature may be described.

Different approaches to design of circuitry exist, for example, circuitry may be synchronous or asynchronous with respect to a clock. Circuitry may be designed to be static or be dynamic. Different circuit design philosophies may be used to implement different functional units or parts thereof. Absent some context-specific basis, "circuitry" encompasses all such design approaches.

Although circuitry or functional units described herein may be most frequently implemented by electrical circuitry, and more particularly, by circuitry that primarily relies on a transistor implemented in a semiconductor as a primary switch element, this term is to be understood in relation to the technology being disclosed. For example, different physical processes may be used in circuitry implementing aspects of the disclosure, such as optical, nanotubes, micro-electrical mechanical elements, quantum switches or memory storage, magnetoresistive logic elements, and so on. Although a choice of technology used to construct circuitry or functional units according to the technology may change over time, this choice is an implementation decision to be made in accordance with the then-current state of technology. This is exemplified by the transitions from using vacuum tubes as switching elements to using circuits with discrete transistors, to using integrated circuits, and advances in memory technologies, in that while there were many inventions in each of these areas, these inventions did not necessarily fundamentally change how computers fundamentally worked. For example, the use of stored programs having a sequence of instructions selected from an instruction set architecture was an important change from a computer that required physical rewiring to change the program, but subsequently, many advances were made to various functional units within such a stored-program computer.

Functional modules may be composed of circuitry, where such circuitry may be fixed function, configurable under program control or under other configuration information, or some combination thereof. Functional modules themselves thus may be described by the functions that they perform, to helpfully abstract how some of the constituent portions of such functions may be implemented.

In some situations, circuitry and functional modules may be described partially in functional terms, and partially in structural terms. In some situations, the structural portion of such a description may be described in terms of a configuration applied to circuitry or to functional modules, or both.

Although some subject matter may have been described in language specific to examples of structural features and/or method steps, it is to be understood that the subject matter defined in the appended claims is not necessarily limited to these described features or acts. For example, a given structural feature may be subsumed within another structural element, or such feature may be split among or distributed to distinct components Similarly, an example portion of a process may be achieved as a by-product or concurrently with performance of another act or process, or may be performed as multiple separate acts in some implementations. As such, implementations according to this disclosure are not limited to those that have a 1:1 correspondence to the examples depicted and/or described.

Above, various examples of computing hardware and/or software programming were explained, as well as examples how such hardware/software can intercommunicate. These examples of hardware or hardware configured with software and such communications interfaces provide means for accomplishing the functions attributed to each of them. For example, a means for performing implementations of software processes described herein includes machine executable code used to configure a machine to perform such process. Some aspects of the disclosure pertain to processes carried out by limited configurability or fixed function circuits and in such situations, means for performing such processes include one or more of special purpose and limited-programmability hardware. Such hardware can be controlled or invoked by software executing on a general purpose computer.

Implementations of the disclosure may be provided for use in embedded systems, such as televisions, appliances, vehicles, or personal computers, desktop computers, laptop computers, message processors, hand-held devices, multi-processor systems, microprocessor-based or programmable consumer electronics, game consoles, network PCs, mini-computers, mainframe computers, mobile telephones, PDAs, tablets and the like.

In addition to hardware embodiments (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Embodiments can be disposed in computer usable medium including non-transitory memories such as memories using semiconductor, magnetic disk, optical disk, ferrous, resistive memory, and so on.

As specific examples, it is understood that implementations of disclosed apparatuses and methods may be implemented in a semiconductor intellectual property core, such as a microprocessor core, or a portion thereof, embodied in a Hardware Description Language (HDL)), that can be used to produce a specific integrated circuit implementation. A computer readable medium may embody or store such description language data, and thus constitute an article of manufacture. A non-transitory machine readable medium is an example of computer readable media. Examples of other embodiments include computer readable media storing Register Transfer Language (RTL) description that may be adapted for use in a specific architecture or microarchitecture implementation. Additionally, the apparatus and methods described herein may be embodied as a combination of hardware and software that configures or programs hardware.

Also, in some cases, terminology has been used herein because it is considered to more reasonably convey salient points to a person of ordinary skill, but such terminology should not be considered to impliedly limit a range of implementations encompassed by disclosed examples and other aspects. A number of examples have been illustrated and described in the preceding disclosure. By necessity, not every example can illustrate every aspect, and the examples do not illustrate exclusive compositions of such aspects. Instead, aspects illustrated and described with respect to one figure or example can be used or combined with aspects illustrated and described with respect to other figures. As such, a person of ordinary skill would understand from these disclosures that the above disclosure is not limiting as to constituency of embodiments according to the claims, and rather the scope of the claims define the breadth and scope of inventive embodiments herein. The summary and abstract sections may set forth one or more but not all exemplary embodiments and aspects of the invention within the scope of the claims.

What is claimed is:

1. A computation apparatus comprising instruction issue logic for issuing instructions on a pipelined processing unit having a dynamic pipeline depth, and control circuitry configured to produce a control signal that indicates whether an instruction category that defines two or more separable portions of computation, each requiring multiple pipeline iterations, is available for scheduling an instruction for execution by said pipelined processing unit, wherein the instruction issue logic is configured to:

determine, during a first stage, one or more categories of instructions available to be selected for execution, wherein determining one or more categories of instructions comprises receiving said control signal from said control circuitry;

select, during a second stage, one or more instructions that are ready for execution from the one or more categories of instructions determined to be available during the first stage;

retrieve, during a third stage, operands of the one or more selected instructions that are ready for execution; and output said retrieved operands to said pipelined processing unit for processing.

2. The computation apparatus of claim 1, wherein said one or more categories of instructions available to be selected for execution comprises SIMD (single instruction multiple data) instructions.

3. The computation apparatus of claim 2, wherein at least two SIMD instructions are selected during said second stage.

4. The computation apparatus of claim 1, wherein said one or more instructions comprises an instruction requesting evaluation of a transcendental function.

5. The computation apparatus of claim 4, wherein said instruction requesting evaluation of a transcendental function contains a request to evaluate a transcendental function using a converging series approximation in which multiple subsets of terms in the converging series are processed in series through a plurality of stages of said pipelined processing unit and then combined.

6. The computation apparatus of claim 1, wherein said pipelined processing unit comprises a plurality of stages including a stage configurable to output an unrounded result of multiplying two mantissas from two floating point numbers.

7. A method of dynamically optimizing a pipelined processing unit between reduced latency and greater throughput, said pipelined processing unit having a plurality of processing stages in a pipeline, said method comprising selectively inserting a wait stage in said pipeline in a particular clock cycle such that an output of an intermediate stage of the pipeline is provided to an earlier stage of the pipeline from said wait stage after an additional clock cycle instead of being provided to said earlier stage from said intermediate stage in a next clock cycle after said particular clock cycle, in dependence on whether multiple separate portions of a next instruction scheduled for execution by said pipelined processing unit can be executed simultaneously.

8. The method of claim 7, wherein a next instruction scheduled for execution comprises a SIMD (single instruction multiple data) instruction.

9. The method of claim 7, wherein a next instruction scheduled for execution comprises an instruction requesting evaluation of a transcendental function.

10. The method of claim 9, wherein said instruction requesting evaluation of a transcendental function contains a request to evaluate a transcendental function using a converging series approximation in which multiple subsets of terms in the converging series are processed in series through the plurality of processing stages and then combined.

11. A non-transitory machine readable medium having stored thereon a computer readable dataset description of an integrated circuit that, when processed, causes a layout processing system to generate a circuit description used in fabrication of a computation apparatus comprising instruction issue logic for issuing instructions on a pipelined processing unit having a dynamic pipeline depth, and control circuitry configured to produce a control signal that indicates whether an instruction category that defines two or more separable portions of computation, each requiring multiple pipeline iterations, is available for scheduling an instruction for execution by said pipelined processing unit, wherein the instruction issue logic is configured to:

determine, during a first stage, one or more categories of instructions available to be selected for execution, wherein determining one or more categories of instructions comprises receiving said control signal from said control circuitry;

select, during a second stage, one or more instructions that are ready for execution from the one or more categories of instructions determined to be available during the first stage;

retrieve, during a third stage, operands of the one or more selected instructions that are ready for execution; and     output said retrieved operands to said pipelined processing unit for processing.

12. The non-transitory machine readable medium of claim 11, wherein said one or more categories of instructions available to be selected for execution comprises SIMD (single instruction multiple data) instructions.

13. The non-transitory machine readable medium of claim 12, wherein at least two SIMD instructions are selected during said second stage.

14. The non-transitory machine readable medium of claim 11, wherein said one or more instructions comprises an instruction requesting evaluation of a transcendental function.

15. The non-transitory machine readable medium of claim 14, wherein said instruction requesting evaluation of a transcendental function contains a request to evaluate a transcendental function using a converging series approximation in which multiple subsets of terms in the converging series are processed in series through a plurality of stages of said pipelined processing unit and then combined.

16. The non-transitory machine readable medium of claim 11, wherein said pipelined processing unit comprises a plurality of stages including a stage configurable to output an unrounded result of multiplying two mantissas from two floating point numbers.

\* \* \* \* \*